US009910789B2

(12) United States Patent
Katayama et al.

(10) Patent No.: US 9,910,789 B2
(45) Date of Patent: Mar. 6, 2018

(54) ELECTRICAL AND OPTICAL MEMORY ACCESS

(71) Applicants: INTERNATIONAL BUSINESS MACHINES CORPORATION; IBM JAPAN, LTD., Tokyo (JP)

(72) Inventors: Yasunao Katayama, Tokyo (JP); Seiji Muneto, Tokyo (JP); Atsuya Okazaki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 14/441,857

(22) PCT Filed: Oct. 11, 2013

(86) PCT No.: PCT/JP2013/077738
§ 371 (c)(1),
(2) Date: Jul. 1, 2015

(87) PCT Pub. No.: WO2014/073324
PCT Pub. Date: May 15, 2014

(65) Prior Publication Data
US 2015/0309945 A1    Oct. 29, 2015

(30) Foreign Application Priority Data
Nov. 12, 2012  (JP) ................................ 2012-248246

(51) Int. Cl.
*G06F 12/00*     (2006.01)
*G06F 12/14*     (2006.01)
(Continued)

(52) U.S. Cl.
CPC .......... *G06F 12/14* (2013.01); *G06F 13/1657* (2013.01); *G06F 13/4022* (2013.01); *H04Q 11/0001* (2013.01); *G06F 2212/2542* (2013.01)

(58) Field of Classification Search
CPC .. G06F 13/16; G06F 13/1657; G06F 13/4022; G06F 12/14; G06F 2212/2542; H04Q 11/0001
(Continued)

(56) References Cited

U.S. PATENT DOCUMENTS 6,125,104 A * 9/2000 Shiragaki ................ H04J 3/14
370/216
6,829,437 B2 * 12/2004 Kirby ................. H04Q 11/0005
398/115
(Continued)

FOREIGN PATENT DOCUMENTS

EP    0356110 A2 * 2/1990 ............. G06F 13/14
JP    10187646 A    7/1998
(Continued)

OTHER PUBLICATIONS

Reji Thomas, "A Study on Optical Switching: An Efficient Switching Tool for Optical Communication Network", International Journal of Innovative Research in Computer and Communication Engineering, vol. 3, Issue 5, May 2015.*
(Continued)

*Primary Examiner* — Pierre-Michel Bataille
(74) *Attorney, Agent, or Firm* — Steven F. McDaniel

(57) ABSTRACT

A processor issues a command to a memory through an electrical memory link and performs a process according to the command through the electrical memory link. The processor issues a routing command to an optical circuit switch (OCS) through an OCS control line. In response to the routing command, the OCS establishes a routing of an optical memory link from the processor to the BDM. In response to the establishment of the optical memory link from the processor to the BDM, the processor (or a BDM (internal/dedicated) controller) switches from performing the process through the electrical memory link to performing
(Continued)

a process through the optical memory link (continuously without an interruption between the successive processes). Corresponding systems are also disclosed herein.

18 Claims, 6 Drawing Sheets

(51) Int. Cl.
*G06F 13/16* (2006.01)
*G06F 13/40* (2006.01)
*H04Q 11/00* (2006.01)

(58) Field of Classification Search
USPC .................................................. 711/154, 169
See application file for complete search history.

(56) References Cited

U.S. PATENT DOCUMENTS

| | | |
|---|---|---|
| 9,184,845 B1 | 11/2015 | Vahdat et al. |
| 9,299,423 B2 | 3/2016 | Baker et al. |
| 9,479,219 B1 | 10/2016 | Gandham et al. |
| 2008/0025288 A1 | 1/2008 | Benner et al. |
| 2008/0222351 A1 | 9/2008 | Verdiell et al. |
| 2011/0052191 A1* | 3/2011 | Beshai ............... H04Q 11/0005 398/52 |
| 2013/0215589 A1* | 8/2013 | Nowak .................. A47B 21/06 361/807 |
| 2013/0275705 A1* | 10/2013 | Schenfeld ........... G06F 12/0292 711/165 |
| 2015/0300840 A1* | 10/2015 | Haeberle ................ G01D 5/145 324/207.21 |

FOREIGN PATENT DOCUMENTS

| | | | |
|---|---|---|---|
| JP | 2003178039 A | 6/2003 | |
| JP | 2006302270 A | 11/2006 | |
| JP | 2010009628 A | 1/2010 | |
| JP | 4634548 B2 | 2/2011 | |
| JP | 2013005317 A * | 1/2013 | |
| WO | 2011132310 A1 | 10/2011 | |
| WO | 2014073324 A1 | 5/2014 | |
| WO | WO 2014113387 A1 * | 7/2014 | ............. H04B 10/40 |

OTHER PUBLICATIONS

"Establishment of Electrical/Optical Memory Link Using Optical Circuit Switch (OCS)", Japan Application No. 2012-248246 (English Translation), filed on Nov. 12, 2012, pp. 1-28.

* cited by examiner ized electrical/optical memory link system due to a growing demand for processing "big data", which may require support of in-memory processing that is several magnitudes larger than previously required.

ELECTRICAL AND OPTICAL MEMORY ACCESS

CROSS-REFERENCE TO RELATED APPLICATIONS

The application claims priority to PCT Patent Application JP2013/077738, filed on 11 Oct. 2013, and entitled "ESTABLISHMENT OF ELECTRICAL/OPTICAL MEMORY LINK USING OPTICAL CIRCUIT SWITCH (OCS)" and to Japanese Patent Application 2012-248246, filed on 12 Nov. 2012, and entitled "ESTABLISHMENT OF ELECTRICAL/OPTICAL MEMORY LINK USING OPTICAL CIRCUIT SWITCH (OCS)". The foregoing applications are incorporated herein by reference.

BACKGROUND OF THE INVENTION

The present invention relates to data memory. More specifically, the present invention relates to accessing data memory.

Retrieving data from disk storage is an extremely time slow aspect of data processing. In-memory processing can eliminate the need to retrieve data from disk storage. However, memories that are large enough to support in-memory processing may have bandwidth capabilities that remain underutilized with conventional I/O buses and links.

SUMMARY

A method includes issuing, by a processor, a command to a data memory (BDM) through an electrical memory link and performing a process according to the command through the electrical memory link, issuing, by the processor, a routing command to an optical circuit switch (OCS) provided on an optical memory link between the processor and the BDM through an OCS control line between the processor and the OCS, establishing, by the OCS, a routing of the optical memory link from the processor to the BDM in response to the routing command, and in response to recognizing the establishment of the optical memory link from the processor to the BDM, switching by the processor, or a BDM controller, from performing the process through the electrical memory link to performing a process through the optical memory link continuously without an interruption between the successive processes.

A system includes a data memory (BDM) dedicated to each of a plurality of processors, an optical circuit switch (OCS), an optical memory link and an electrical memory link provided between each of the plurality of processors and the BDM, the optical circuit switch (OCS) operably coupled to the optical memory link. Each of the plurality of processors has an OCS control line provided between the processor and the OCS. Each of the processors is configured to issue a command to a BDM other than the BDM dedicated to the processor through the electrical memory link and perform a process according to the command through the electrical memory link. Each of the processors is also configured to issue a routing command to the OCS through the OCS control line command while the processor is performing the process. One of the processors or a BDM controller is configured to switch from performing the process through the electrical memory link to performing a process through the optical memory link continuously without an interruption between the successive processes in response to the OCS establishing a routing of the optical memory link from the processor to the BDM in response to the routing command.

A system includes a first processor, a data memory (BDM) dedicated to a first processor, an optical circuit switch (OCS), an optical memory link and an electrical memory link provided between a second processor and the BDM, an OCS control line provided between the second processor and the OCS. The second processor may be configured to issue a command to the BDM perform a process according to the command through the electrical memory link and to issue a routing command to the OCS through the OCS control line command while the processor is performing the process. The second processor may be configured to switch from performing the process through the electrical memory link to performing a process through the optical memory link continuously without an interruption between the successive processes in response to the OCS establishing a routing of the optical memory link from the second processor to the BDM in response to the routing command.

DETAILED DESCRIPTION

Hereinafter, the present invention will be described in various embodiments. It should be noted, however, that the following embodiments are not intended to limit the scope of the appended claims, and that not all the combinations of features described in the embodiments are necessarily required by the present invention.

Figure 1:
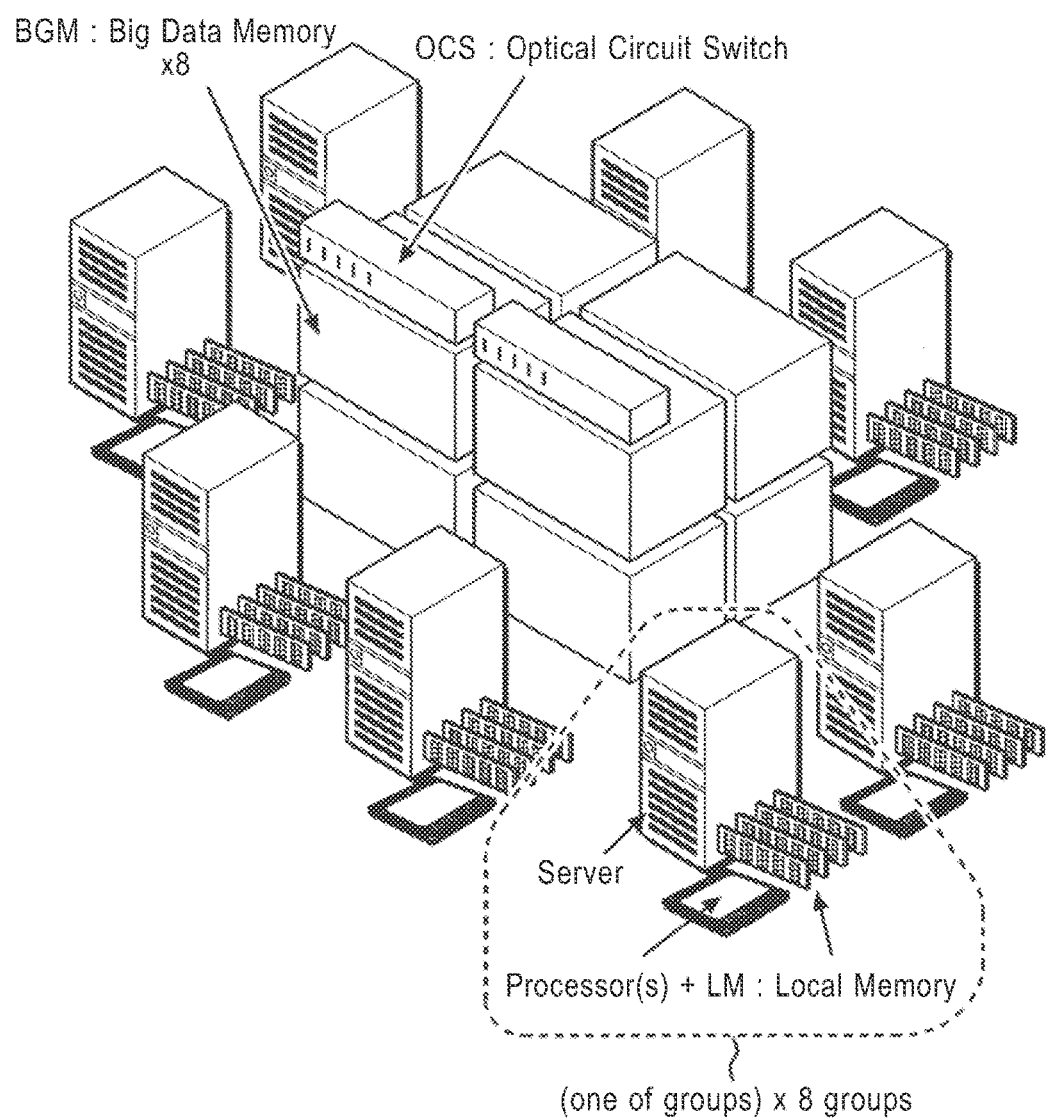
FIG. 1 is a perspective view illustrating a general configuration of a large-sized electrical/optical memory link system.

FIG. 1 is a perspective view illustrating a general configuration of a large-sized electrical/optical memory link system. Big data memories (BDMs) 110 may be provided in the large-sized electrical/optical memory link system due to a growing demand for processing "big data", which may require support of in-memory processing that is several magnitudes larger than previously required.

The term "in-memory" is a state where all program codes to be used during execution are loaded into a memory before the execution of the program so that the program codes do not need to be read from storage such as hard disks during the execution. Although in-memory processing requires implementation of a sufficiently large memory as compared with the size of the program, it eliminates the need for overlays and disk accesses using a virtual memory and therefore increases execution speed. In some embodiments, all of the data to be processed is also stored within memory.

In the depicted embodiment, each server constitutes a group including a processor (Proc) and a local memory (LM) having a given memory capacity. Eight memories are depicted, which surround the big data memories (BDMs) on which processing is performed. The big data memories (BDMs) are also grouped into the same number of units as the number of server groups, which is eight here.

Such a system configuration, known as Symmetric Multiprocessing (SMP), is being used. Symmetric multiprocessing (SMP) is a "shared memory parallel computing (multiprocessing)" in which a physical memory is shared and managed. In SMP, multiple processors perform parallel processing. Processing is symmetrically and evenly allocated to all CPUs without relying on asymmetrically allocating processing to particular CPUs.

The system includes a system memory virtualized by an OS kernel and a CPU cache synchronization mechanism, and a lock control system which finely manages various kinds of resources. The system evenly allocates interrupt handling at software/hardware levels to the CPUs, and performs processing while locking resources required for the processing unit.

Accordingly, from the outside the server, the system seems as if it were a server running on a single CPU. However, a server with a larger memory capacity may have a larger number of SMP nodes, which increases the average number of hops for remote memory access, increases the access latency, and can degrade performance per thread. A high node SMP server may have many processing threads, processes, and VMs, resulting in a large number of remote memory accesses.

As seen above, affinity management is important but has limitations. Connecting an SCM (storage-class memory) also has limitations. For example, if an SCM is connected as an I/O memory through a bus such as a PCIe bus, a sufficient bandwidth cannot be ensured. Furthermore, the overhead of paging will be large.

To directly map into a main memory address space like a traditional DIMM, a huge quantity of memory devices are required and (a) wiring and (b) switching need to be considered. A DIMM (dual inline memory module) is a memory module in which multiple DRAM chips are mounted on a printed circuit board and is used as a main memory of computers. Since wiring is made using optical memory links, broadband communication is possible between locations several meters apart from each other. Switching is done by optical circuit switches (OCSs). However, the OCSs have a long switching time. In practice, OCSs are used for switching of communication lines and network lines in long-distance communication systems and data centers.

Figure 2:
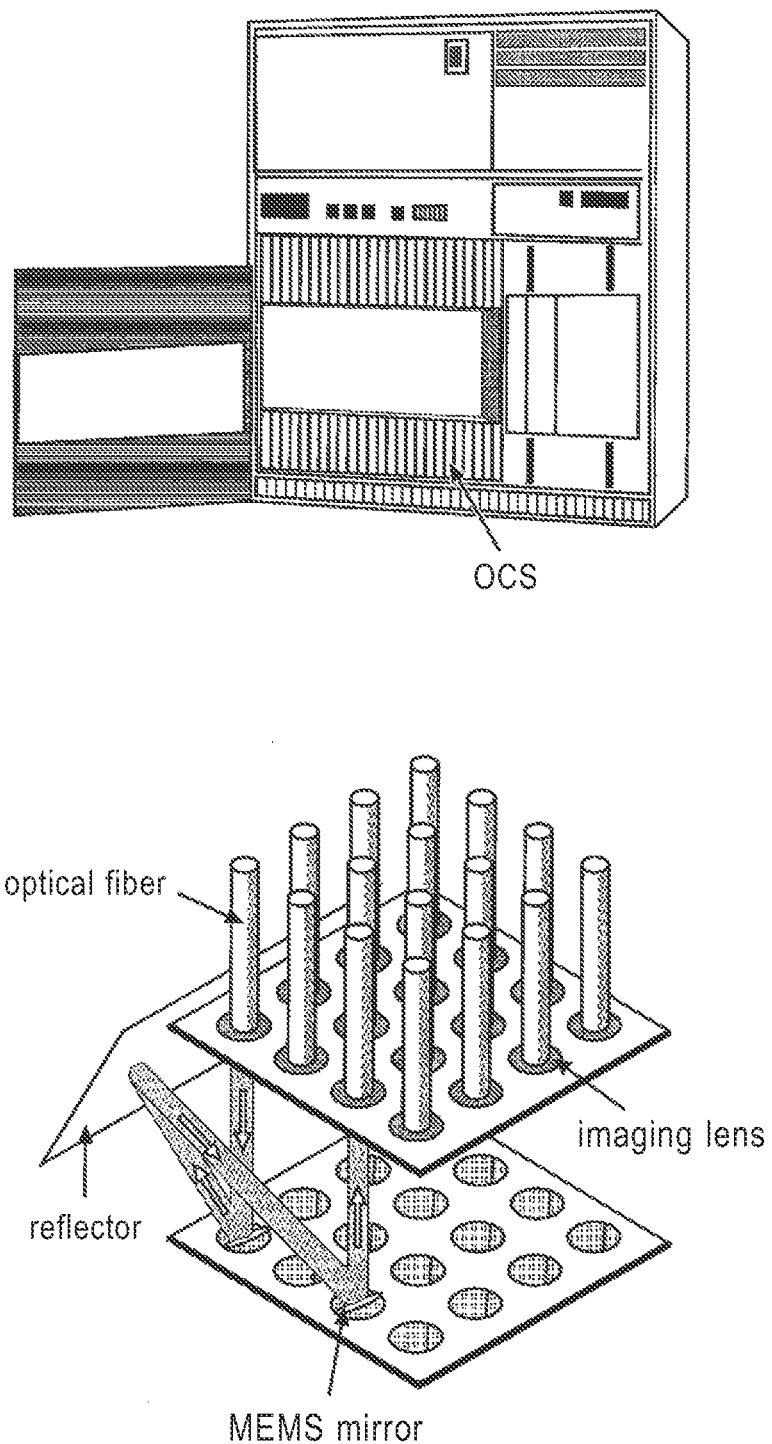
FIG. 2 is a diagram illustrating an exemplary configuration of an optical circuit switch.

FIG. 2 is a diagram illustrating an exemplary configuration of an optical circuit switch (OCS). A MEMS device, which is a typical optical circuit switch (OCS), is known in which a component called a MEMS mirror physically changes the angle at which light is reflected. Accordingly, the operation inherently is slow due to the waiting time required for physical change of the angle of the mirror. For example, the operation may take 30 milliseconds or more.

As seen above, optical circuit switches have the characteristic of slow switching time, which result in a long time for establishing an optical memory routing and long memory access latency. The embodiments disclosed herein address at least some of the above issues and provide selective use of both an electrical memory link and an optical memory link by changing routing by means of an optical circuit switch. For example, some embodiments provide a method and system that enable a processor to perform processes on a memory (big data memory: BDM) while selectively using an electrical memory link and an optical memory link, and provide an optical circuit switch (OCS) that helps the processor to perform processing in that manner.

In some embodiments, a processor issues a command to a memory through an electrical memory link and performs a process according to the command through the electrical memory link and the processor issues a routing command to an OCS through an OCS control line. In response to the routing command, the OCS establishes a routing of the optical memory link from the processor to a memory (BDM).

In response to the processor (or a BDM (internal/dedicated) controller) recognizing the establishment of the optical memory link from the processor to the memory (BDM), the processor switches from performing the process through the electrical memory link to performing a process thorough the optical memory link (continuously without an interruption between the successive processes).

The present invention enables (helps) a processor or a BDM (internal/dedicated) controller to switch from performing a process through an electrical memory link to performing a process though an optical memory link (continuously without an interruption between the successive processes). Through the hybrid use of an electrical memory link and an optical memory link, remote memory (BDM) access latency and bandwidth can be improved.

Figure 3:
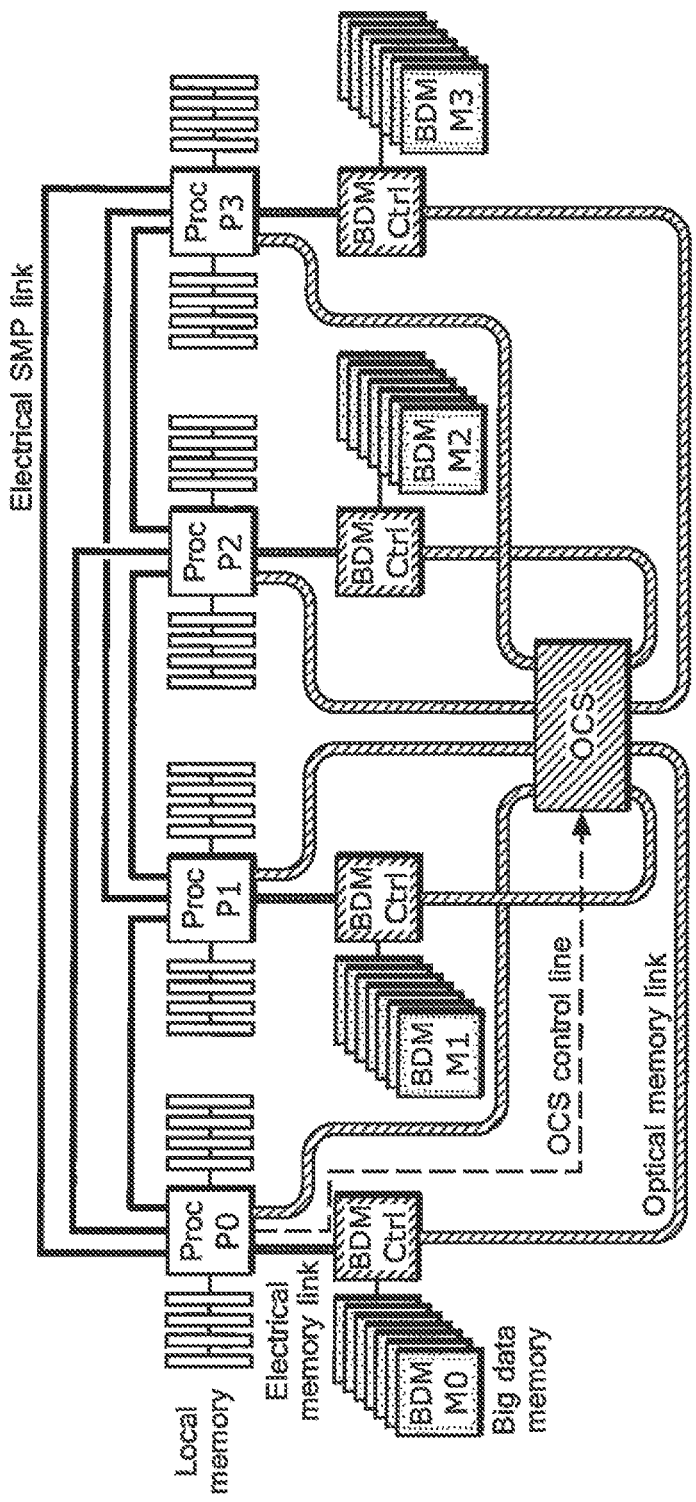
FIG. 3 is a linkage diagram illustrating electrical memory links and optical memory links to which the present invention is applied.

FIG. 3 is a linkage diagram illustrating electrical memory links and optical memory links to which the present invention is applied. FIG. 3 illustrates a half part of the configuration illustrated in FIG. 1. Specifically, FIG. 3 illustrates the linkages among four groups of servers and four groups of big data memories (BDMs). In the depicted embodiment, processors are grouped into four, Proc P0, Proc P1, Proc P2 and Proc 3, and a local memory (LM) having a given memory capacity that is associated with each Proc. Electrical SMP links are formed as electrical linkages so that Proc P0, Proc P1, Proc P2 and Proc P3 are paired.

Big data memories (BDMs), BDM M0, BDM M1, BDM M2 and BDM M3, are provided for Proc P0, Proc P1, Proc P2 and Proc P3, respectively. The BDMs may be dedicated to, or simply assigned to, the individual processors (Proc).

To control BDM M0, BDM M1, BDM M2 and BDM M3, electrical memory links are formed to P0, Proc P1, Proc P2 and Proc P3, respectively. A BDM (internal/dedicated) controller (BDM Ctrl) may be provided (between each processor and its BDM) to eliminate the need for each processor itself to control the BDM. Each processor (Proc) is connected to an optical circuit switch (OCS) through an optical memory link. Not all routings of these optical memory links are required to be permanently established but may selectively established by the optical circuit switches.

Multiple BDMs (internal/dedicated) controllers (BDM Ctrl) may be provided as illustrated to connect the processors (Proc) to the optical circuit switches (OCS) through optical memory links to eliminate the need for each of the processors (Proc) itself to control the BDM. Various commands such as routing commands are issued from the processors (Proc) to the optical circuit switches (OCS) through OCS control lines.

Figure 4:
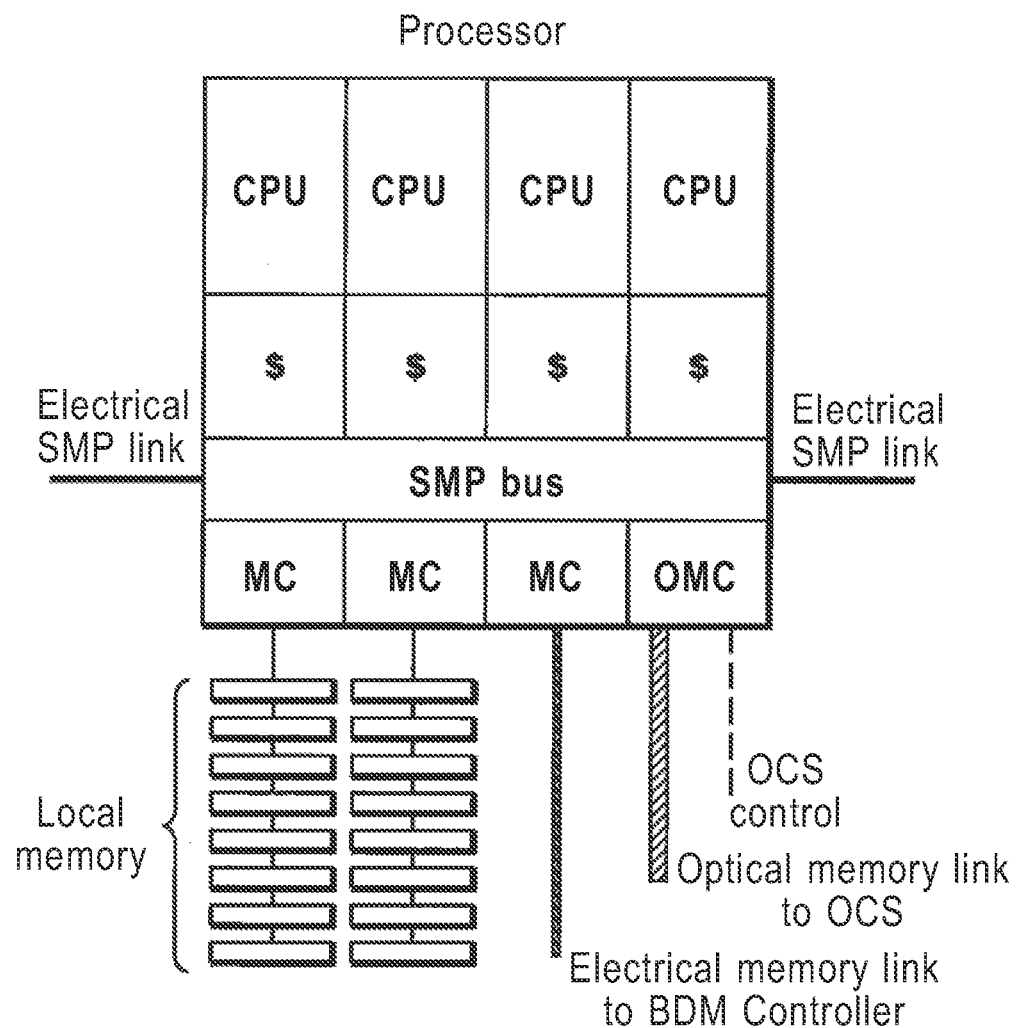
FIG. 4 is a diagram illustrating multiple links from multiple processors.

FIG. 4 is a diagram illustrating multiple links from multiple processors (Proc). Each of Proc P0, Proc P1, Proc P2 and Proc P3 is configured as a component unit so that each of the processors can input or output through multiple links as illustrated in FIG. 4. OCS controls and the optical memory links to optical circuit switches (OCS) are controlled through an optical memory controller (OMC). Local memories (LM) having a predetermined memory capacity and electrical memory links to the BDM (internal/dedicated) controllers (BDM Ctrl) are controlled through memory controllers (MC). The electrical SMP links are connected to CPUs (four CPUs in this figure) in each processor (Proc) through an SMP bus.

Figure 5:
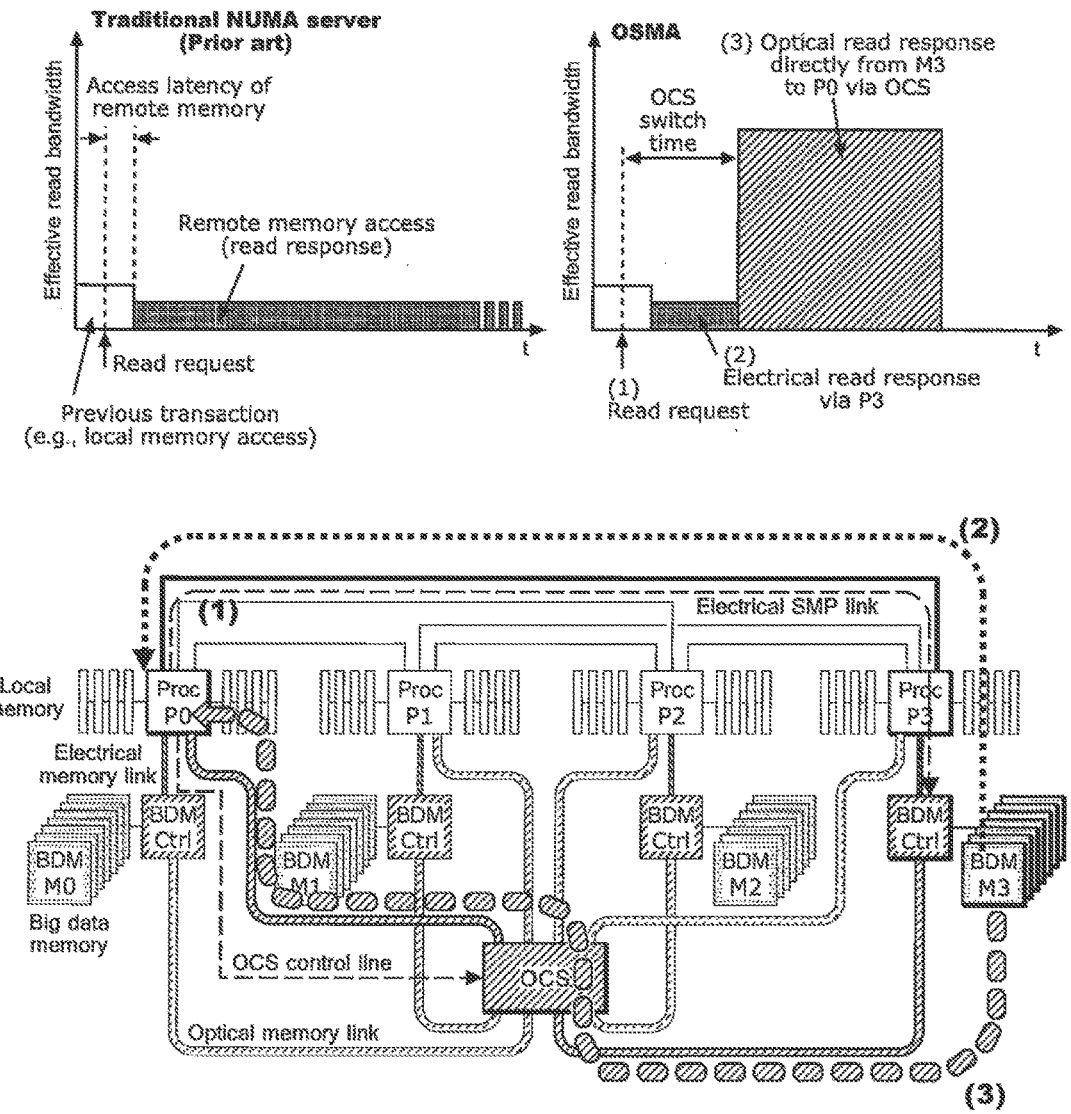
FIG. 5 is a diagram illustrating a configuration for performing processes on a memory BDM (big data memory) by making a selective use of both an electrical memory link and an optical memory link, which constitutes the present invention.

FIG. 5 is a diagram illustrating a configuration in which processes on a memory (big data memory: BDM) are performed while selectively using an electrical memory link and an optical memory link. An example of a memory transaction will be described in which a huge-memory read request is issued from software running on Proc P0 to BDM M3 when the route from Proc P0 to BDM M3 through the OCS has not been established.

Proc P0 sends a read request command to the BDM (internal/dedicated) controller (BDM Ctrl) of BDM M3 via Proc P3 through the electrical memory link. At the same time, Proc P0 sends a routing command to the OCS through the OCS control line so as to establish an optical memory link between Proc P0 and BDM M3.

The routing command is sent "at the same time" (e.g., concurrently, immediately after, or immediately before) in order to switch as quickly as possible but this is not required to carry out the present invention. Subsequently, the BDM (internal/dedicated) controller (BDM Ctrl) of BDM M3 reads data from BDM M3, a memory device, according to the read request command and sends the read data to Proc P0 through Proc P3 and then through the electrical SMP link.

The electrical memory link has a narrower bandwidth than the optical memory link but has a shorter access latency than the optical memory link. That is, an electrical read response via Proc P3 does not need to wait for establishment of the optical memory link and therefore quicker processing is possible.

In response to the routing command, the optical circuit switch (OCS) establishes the optical memory link routing from the processor to the memory (BDM). In response to recognizing that the routing between Proc P0 and BDM M3 has been established in the OCS, the BDM (internal/dedicated) controller (BDM Ctrl) of BDM M3 directly transfers the next and subsequent data to Proc P0 through the optical memory link (with a high bandwidth) via the OCS instead of the electrical memory link via BDM M3.

That is, switching is made from the process performed through the electrical memory link to the process performed through the optical memory link continuously without an interruption between the successive processes. However, the switching "continuously without an interruption between the successive processes" is not essential to carrying out the present invention. Furthermore, technical definition of the term "establishment (of a route/routing)" should be flexibly interpreted in accordance with the present invention.

Figure 6:
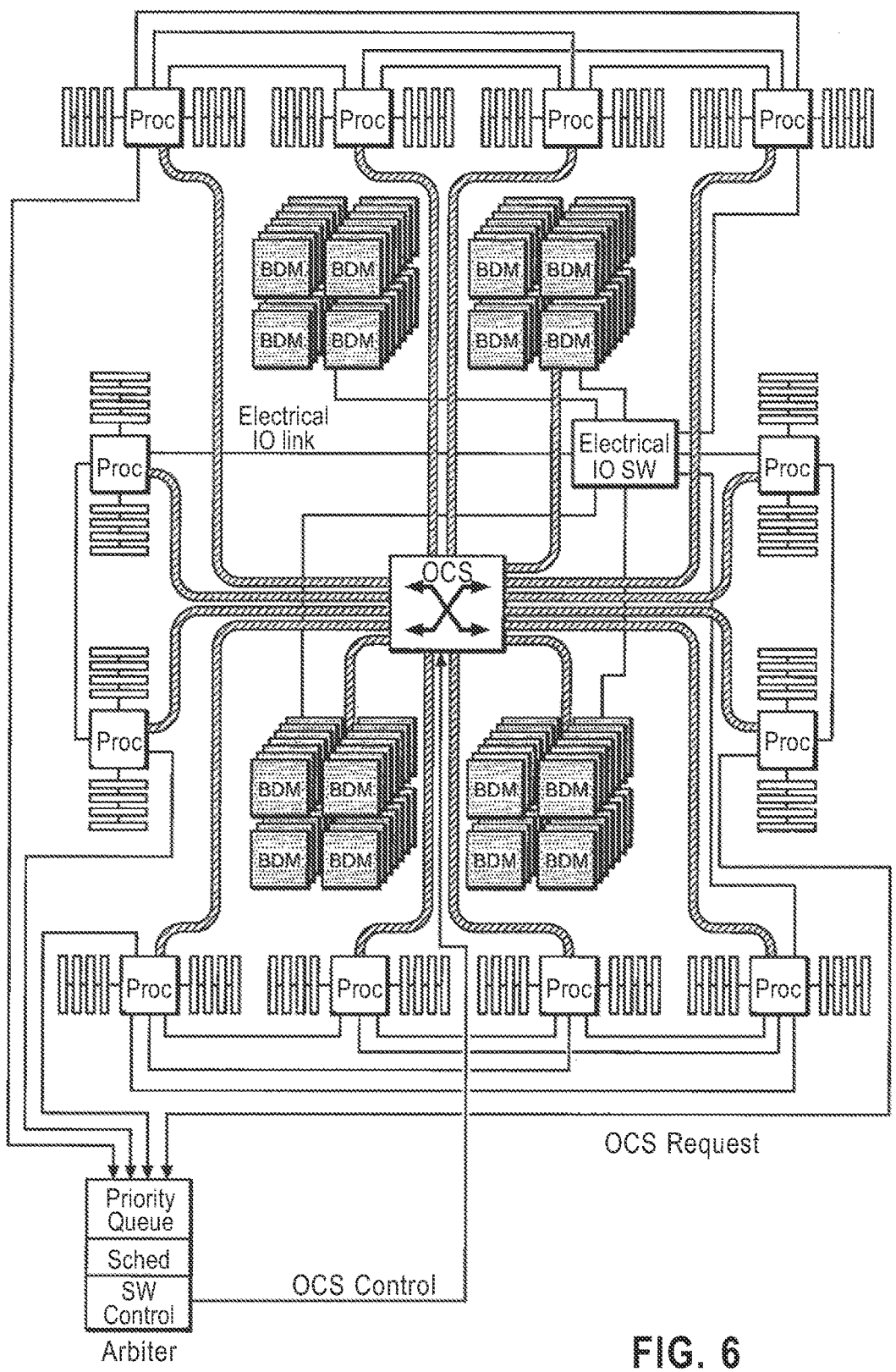
FIG. 6 is a linkage diagram illustrating generally a larger-sized configuration of electrical memory links and optical memory links using the present invention.

FIG. 6 is a linkage diagram generally illustrating a larger-sized configuration of electrical memory links and optical memory links using the present invention. The links are configured so that an OCS request can be received from each processor (Proc) and an arbiter arbitrates so that a routing can be established by the OCS. Scheduling (Sched) can be performed inside the arbiter according to a priority queue to perform software control (SW Ctrl). According to the use of the optical circuit switch of the present invention, the optical circuit switch can generally help a processor perform processes on a memory (BDM: Big Data Memory) other than a memory (BDM) dedicated to the processor itself.

It should be noted that the apparatuses disclosed herein may be integrated with additional circuitry within integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A system comprising:
 a plurality of processors;
 a data memory (BDM) dedicated to each of the plurality of processors; and
 an optical circuit switch (OCS);
 an optical memory link and an electrical memory link provided between each of the plurality of processors and the BDM;
 the optical circuit switch (OCS) operably coupled to the optical memory link;
 each of the plurality of processors has an OCS control line provided between the processor and the OCS;
 each of the plurality of processors configured to issue a command to a BDM other than the BDM dedicated to the processor through the electrical memory link and perform a data transfer process according to the command through the electrical memory link;
 each of the plurality of processors configured to issue a routing command to the OCS through the OCS control line command while the processor is performing the data transfer process; and
 wherein one of the processors or a BDM controller is configured to switch from performing the data transfer process through the electrical memory link to performing the data transfer process through the optical memory link continuously without an interruption in the data transfer process in response to the OCS establishing a routing of the optical memory link from the processor to the BDM in response to the routing command.

2. The system of claim 1, wherein each of the processors is further configured to issue the routing command at the same time with issuing the command to the data memory.

3. The system of claim 1, wherein each of the processors is further configured to issue the routing command immediately after issuing the command to the data memory.

4. The system of claim 1, wherein the OCS comprises a MEMs mirror.

5. The system according to claim 1, further comprising an arbiter configured to arbitrate OCS requests from each of the plurality of processors (Proc).

6. The system according to claim 5, wherein the arbiter is configured to perform scheduling according to a priority queue to enable software control (SW Ctrol).

7. A system comprising:
   a first processor;
   a data memory (BDM) dedicated to a first processor;
   an optical circuit switch (OCS);
   an optical memory link and an electrical memory link provided between a second processor and the BDM;
   an OCS control line provided between the second processor and the OCS;
   the second processor configured to issue a command to the BDM perform a data transfer process according to the command through the electrical memory link;
   the second processor configured to issue a routing command to the OCS through the OCS control line command while the processor is performing the data transfer process; and
   wherein the second processor is configured to switch from performing the data transfer process through the electrical memory link to performing the data transfer process through the optical memory link continuously without an interruption in the data transfer process in response to the OCS establishing a routing of the optical memory link from the second processor to the BDM in response to the routing command.

8. The system of claim 7, wherein the second processor is further configured to issue the routing command at the same time with issuing the command to the data memory.

9. The system of claim 7, wherein the second processor is further configured to issue the routing command immediately after issuing the command to the data memory.

10. The system of claim 7, wherein the OCS comprises a MEMs mirror.

11. The system of claim 7, further comprising an arbiter configured to arbitrate OCS requests from each of the plurality of processors (Proc).

12. The system of claim 11, wherein the arbiter is configured to perform scheduling according to a priority queue to enable software control (SW Ctrol).

13. A method comprising:
   issuing, by a processor, a command to a data memory (BDM) through an electrical memory link;
   performing a data transfer process according to the command through the electrical memory link;
   issuing, by the processor, a routing command to an optical circuit switch (OCS) provided on an optical memory link between the processor and the BDM through an OCS control line between the processor and the OCS;
   establishing, by the OCS, a routing of the optical memory link from the processor to the BDM in response to the routing command; and
   in response to recognizing establishment of the optical memory link from the processor to the BDM, switching by the processor, or a BDM controller, from performing the data transfer process through the electrical memory link to performing the data transfer process through the optical memory link continuously without an interruption in the data transfer process.

14. The method of claim 13, wherein issuing the routing command occurs at the same time as issuing the command to the data memory.

15. The method of claim 13, wherein issuing the routing command occurs immediately after issuing the command to the data memory.

16. The method of claim 13, wherein the OCS comprises a MEMs mirror.

17. The method of claim 13, further comprising arbitrating OCS requests from each of a plurality of processors (Proc).

18. The method of claim 17, wherein arbitrating OCS requests comprises scheduling according to a priority queue to enable software control (SW Ctrol).

* * * * *